(12) United States Patent
Mori et al.

(10) Patent No.: US 11,226,601 B2
(45) Date of Patent: Jan. 18, 2022

(54) METHOD OF ESTIMATING ADJUSTMENT AMOUNT FOR SUPPORT POSITION OF SUPPORT DEVICE, METHOD OF ADJUSTING SUPPORT POSITION OF SUPPORT DEVICE, AND APPARATUS FOR ESTIMATING ADJUSTMENT AMOUNT FOR SUPPORT POSITION OF SUPPORT DEVICE

(71) Applicant: DMG MORI CO., LTD., Nara (JP)

(72) Inventors: Kotaro Mori, Kyoto (JP); Daisuke Kono, Kyoto (JP)

(73) Assignee: DMG MORI CO., LTD., Nara (JP)

( * ) Notice: Subject to any disclaimer, the term of this patent is extended or adjusted under 35 U.S.C. 154(b) by 233 days.

(21) Appl. No.: 16/582,117

(22) Filed: Sep. 25, 2019

(65) Prior Publication Data
US 2020/0142369 A1    May 7, 2020

(30) Foreign Application Priority Data
Nov. 5, 2018 (JP) .............................. JP2018-208129

(51) Int. Cl.
*G05B 17/02* (2006.01)
*G06F 17/16* (2006.01)

(52) U.S. Cl.
CPC .............. *G05B 17/02* (2013.01); *G06F 17/16* (2013.01)

(58) Field of Classification Search
CPC ........ G05B 17/02; G05B 19/404; G06F 17/16
USPC ............................................................. 703/2
See application file for complete search history.

(56) References Cited

U.S. PATENT DOCUMENTS

2018/0292803 A1* 10/2018 Kurek .................. G05B 19/402

FOREIGN PATENT DOCUMENTS

JP    H04336927 A    11/1992

OTHER PUBLICATIONS

Kotaro Mori et al., "Support placement for machine tools using stiffness model", 2015, International Journal of Automation Technology 9.6, pp. 680-688.*
Kotaro Mori et al., "Model-based installation of viscoelastic damper support for reduction of residual vibration", 2018, International Journal of Automation Technology 12.5, pp. 650-657.*

(Continued)

*Primary Examiner* — Juan C Ochoa
(74) *Attorney, Agent, or Firm* — von Briesen & Roper, s.c.

(57) ABSTRACT

A support position adjustment amount estimation apparatus includes a reference load data storage storing reference load data for each support device obtained when a reference surface of a machine tool is in a leveled condition, a relational equation storage storing a relational equation between an amount of variation of a support position in each support device from a reference support position and an amount of variation of a load in each support device from the reference load data with the support position in one support device selected from three or more support devices fixed, and an adjustment amount estimator estimating a support position adjustment amount for each support device other than the fixed support device based on load data detected in all of the support devices, and the reference load data for all of the support devices, and the relational equation.

5 Claims, 6 Drawing Sheets

(56) References Cited

OTHER PUBLICATIONS

Daisuke Kono et al., "A method for stiffness tuning of machine tool supports considering contact stiffness", 2015, International Journal of Machine Tools and Manufacture 90, pp. 50-59.*

Kotaro Mori et al., "Modelling of viscoelastic damper support for reduction in low frequency residual vibration in machine tools", 2017, Precision Engineering 50, pp. 313-319.*

* cited by examiner

METHOD OF ESTIMATING ADJUSTMENT AMOUNT FOR SUPPORT POSITION OF SUPPORT DEVICE, METHOD OF ADJUSTING SUPPORT POSITION OF SUPPORT DEVICE, AND APPARATUS FOR ESTIMATING ADJUSTMENT AMOUNT FOR SUPPORT POSITION OF SUPPORT DEVICE

BACKGROUND

Field of the Disclosure

The present disclosure relates to a method of and an apparatus for estimating, in a machine tool supported by three or more support devices, an adjustment amount for a support position in each of the support devices needed for leveling a preset reference surface of the machine tool. The present disclosure also relates to a method of adjusting the support position in each of the support devices.

Background of the Disclosure

A bed, as a fundamental structure, of a machine tool as mentioned above is typically manufactured such that a reference surface set on the bed is leveled in a state of being supported by three or more support devices, and other structures of the machine tool are assembled in a state where the bed is supported by the support devices and the reference surface of the bed is leveled. Therefore, the machine tool can provide an expected machining accuracy only by performing machining operations in a state of being installed such that the reference surface is leveled. Note that a level has been generally used for detection of levelness of the reference surface.

Conventionally, in view of the above background, when a machine tool is installed in a plant or the like, the bed is, as described above, supported by three or more support devices and support positions of the support devices in their height direction are adjusted so that the reference surface is leveled.

After the machine tool has been installed, levelness of the reference surface cannot last forever and it is varied due to secular change of the machine tool, working conditions of the machine tool, or the like. Therefore, when the levelness of the reference surface exceeds a predetermined allowable range after installation of the machine tool, the support position of each of the support devices has to be readjusted so that the levelness of the reference surface falls within the allowable range.

However, the levelness of the reference surface is varied even by a minute amount, of Change of the support position in each support device. Further, varying a support load in one support device leads to imbalance of the support loads in the support devices. Therefore, in order to adjust the support positions of the support devices while balancing the support loads in the support devices so as to cause the levelness of the reference surface to fall within the allowable range, it is required to adjust the support positions in the support devices by trial and error while checking a level, because of which this adjustment is very complicated. Further, such adjustment is very sensory; therefore, in order to accurately and efficiently perform such adjustment, appropriate empirical skills are required.

Hence, there has been proposed an automatic leveling apparatus for a machine tool as disclosed in Japanese Unexamined Patent Application Publication No. H4-336927.

This automatic leveling apparatus is composed of leveling detection means for detecting levelness of a machine bed of a machine tool, control means, and leveling blocks. The leveling blocks are each composed of a vertical slide, a horizontal slide, and a hydraulic cylinder and are disposed under the machine bed. The leveling detection means is composed of a plurality of water containers and a plurality of laser displacement meters, the water containers being communicated with and connected to each other by a water pipe correspondingly to the positions at which the leveling blocks are arranged. The leveling detection means is configured to detect a level change in the machine bed in the form of a distance change between the water surface in each water container and each laser displacement meter and input detection signals into a computer. The control means is composed of solenoid valves for controlling the hydraulic cylinders, a sequencer, and the computer. The sequencer is configured to input therein signals from the computer and signals from a plurality of proximity switches and output signals to the solenoid valves.

In this automatic leveling apparatus, a level change in the machine bed is detected in the form of a distance change between the water surface in each water container and each laser displacement meter, and the necessity of level correction is determined based on whether the detected level change falls within a predetermined range or not. In the case where the level change is out of the predetermined range and level correction is therefore needed, the leveling blocks are driven by their respective hydraulic cylinders under control by the control means. In this way, leveling is automatically carried out.

SUMMARY OF THE DISCLOSURE

By the way, it is common knowledge that it is necessary to support the bed with at least three support devices to stably support the bed; therefore, the bed is typically supported by eight or more support devices so as to more stably support the bed.

Further, the bed is not a perfectly rigid body and the support devices themselves are also not perfectly rigid bodies. Therefore, the support conditions of the support devices are not independent from one another but are linked to one another. Hence, when the support position in one support device is changed, the support conditions of the other support devices, i.e., the support loads and support positions in the other support devices, are varied.

Therefore, in the above-described conventional automatic leveling apparatus, when the levelness of the reference surface is varied out of an allowable range, in order to bring the varied levelness back into the allowable range, the support positions in the support devices have to be restored to their respective original conditions. However, for example, when the support position in a second support device is restored after the support position in a first support device has been restored, the restoration of the support position in the second support device affects the already restored support position in the first support device so that the already restored support position in the first support device is varied. Therefore, in the final analysis, the above-described conventional automatic leveling apparatus cannot solve the problem that it is required to gradually restore the support positions in the support devices while checking the overall status of restoration.

There is no problem in the case where gradually restoring the support positions in the support devices succeed in convergence of the support positions in the support devices.

However, depending on circumstances, it is possible that gradually restoring the support positions in the support devices causes the support positions in the support devices to diverge and fail to converge, such as changing the support position in one support device greatly varies the support position in another support device.

As described above, the conventional automatic leveling apparatus has the problem that the process of adjusting the support positions in the support devices to appropriate positions is complicated and requires time. Further, in some situations, it is possible that the support positions in the support devices cannot be adjusted to appropriate positions due to divergence.

The present disclosure has been achieved in view of the above-described circumstances, and an object thereof is to provide a method and an apparatus which can uniquely estimate an adjustment amount for a support position in each support device needed for restoring levelness of a reference surface of a machine tool bed when the levelness of the reference surface is varied.

Further, another object of the present disclosure is to provide a method which can adjust the support position in each support device based on the adjustment amount uniquely estimated by the aforementioned method and apparatus, without "trial-and-error" operations.

A first aspect of the present disclosure, for solving the above-described problems, relates to a method of estimating, in a machine tool supported by three or more support devices each having a load detector detecting a support load and a support position adjustment mechanism for adjusting a support position, an adjustment amount for a current support position in each of the support devices needed for leveling a preset reference surface of the machine tool, including:

with the support position in each of the support devices when the reference surface of the machine tool is in a leveled condition designated as a reference support position of each of the support devices, obtaining, for each of the support devices, reference position data indicative of the reference support position of the support device when the support devices are positioned in their respective reference support positions and reference load data indicative of a load detected by the load detector of the support device when the support devices are positioned in their respective reference support positions;

based on the obtained reference position data and reference load data, obtaining a relational equation between amounts of position variation and amounts of load variation in the support devices with the support position in one support device selected from the support devices fixed, the amounts of position variation being indicative of an amount of variation of the support position in each of the support devices from the reference support position corresponding thereto, the amounts of load variation being indicative of an amount of variation of load data detected by the load detector of each of the support devices from the reference load data corresponding thereto; and when the load data detected by the load detector of each of the support devices is varied from the reference load data corresponding thereto, estimating the adjustment amount for the support position in each of the support devices other than the fixed support device based on the amounts of load variation detected by all of the support devices and the relational equation.

A second aspect of the present disclosure relates to a method of adjusting the support positions in the support devices, including using the adjustment amounts estimated by the method above to adjust the support positions in the support devices corresponding thereto.

A third aspect of the present disclosure relates to an apparatus for estimating, in a machine tool supported by three or more support devices each having a load detector detecting a support, load and a support position adjustment mechanism for adjusting a support position, an adjustment amount for a current support position in each of the support devices needed for leveling a preset reference surface of the machine tool, including:

a reference load data storage storing, with the support position in each of the support devices when the reference surface of the machine tool is in a leveled condition designated as a reference support position of each of the support devices, for each of the support devices, reference load data indicative of a load detected by the load detector of the support device when the support devices are positioned in their respective reference support positions;

a relational equation storage storing a relational equation between amounts of position variation and amounts of load variation in the support devices with the support position in one support device selected from the support devices fixed, the amounts of position variation being indicative of an amount of variation of the support position in each of the support devices from the reference support position corresponding thereto, the amounts of load variation being indicative of an amount of variation of load data detected by the load detector of each of the support devices from the reference load data corresponding thereto; and an adjustment amount estimator estimating the adjustment amount for the support position in each of the support devices other than the fixed support device based on the load data detected by the load detectors of all of the support devices, the reference load data for all of the support devices stored in the reference load data storage, and the relational equation stored in the relational equation storage.

In the above-described support position adjustment amount estimation method and support position adjustment amount estimation apparatus according to the first and third aspects of the present disclosure, an adjustment amount for the support position in each of the support devices is estimated as follows. First of all, in a preparatory step, with the support position in each of the support devices when the reference surface of the machine tool is in a leveled condition designated as a reference support position of each of the support devices, for each of the support devices, reference position data indicative of the reference support position of the support device when the support devices are positioned in their respective reference support positions and reference load data indicative of load data detected by the load detector of the support device when the support devices are positioned in their respective reference support positions are previously obtained. The obtained reference load data is stored into the reference load data storage.

Further, based on the obtained reference position data and reference load data, a relational equation between amounts of position variation and amounts of load variation in the support devices with the support position in one support device selected from the support devices fixed is previously obtained, the amounts of position variation being indicative of an amount of variation of the support position in each of the support devices from the reference support position corresponding thereto, the amounts of load variation being indicative of an amount of variation of a load detected by the load detector of each of the support devices. For example, the support position in any one of the support devices is varied in increments of a preset (predetermined) amount and an amount of load variation in each of the one and other support devices is calculated based on data on the support load in the support device obtained in the varying process. Subsequently, the support position in each and every one of the support devices is varied in increments of a predetermined amount and an amount of load variation in each of the support devices in the varying process is calculated. Based on the amounts of position variation and amounts of load variation in the support devices obtained, a relational equation between them is obtained. From the thus obtained relational equation, a relational equation between the amounts of position variation and the amounts of load variation in the support devices with the support position in one support device selected from the support devices fixed is derived, the derived relational equation being stored into the relational equation storage.

Thereafter, when levelness of the reference surface of the machine tool exceeds an allowable range and the load data detected by the load detector or load detectors of one or more of the support devices is thereby varied from the reference load data corresponding thereto, the adjustment amount estimator calculates, for each of the support devices other than the fixed support device, an adjustment amount for a current support position in the support device needed for leveling the reference surface of the machine tool, in other words, causing the levelness of the reference surface to fall within the allowable range, based on the load data detected by the load detectors of all of the support devices thereat, the reference load data stored in the reference load data storage, and the relational equation stored in the relational equation storage.

Thus, with the support position adjustment amount estimation method and support position adjustment amount estimation apparatus according to the present disclosure, when levelness of the reference surface of the machine tool exceeds an allowable range, an adjustment amount for the support position in each of the support devices needed for leveling the reference surface can be uniquely estimated. Further, in the support position adjustment method according to the second aspect of the present disclosure, the support position in each of the support devices is adjusted based on the thus uniquely estimated adjustment amount corresponding thereto, which enables the reference surface of the machine tool to be leveled in a single adjustment operation without "trial-and-error" operations.

Note that the relational equation in the first through third aspects of the present disclosure is preferably represented by Equation 1 below with $\Delta Lt_i$ representing the adjustment amount for the support position in an i-th support device $S_i$, $\Delta R_i$ representing the amount of load variation in the i-th support device $S_i$, i being a natural number of 1 through n, and j being any value from 1 to n for referring to the fixed support device $S_j$:

$$\begin{bmatrix} \Delta Lt_1 \\ \vdots \\ \Delta Lt_{j-1} \\ \Delta Lt_{j+1} \\ \vdots \\ \Delta Lt_n \end{bmatrix} = A^+ \times \begin{bmatrix} \Delta R_1 \\ \vdots \\ \Delta R_n \end{bmatrix},$$ [Equation 1]

where $A^+$ is a generalized inverse matrix of a matrix A below holding with $\Delta R_i$ representing the amount of load variation in the i-th support device $S_i$ occurring when the i-th support device $S_i$ shows the amount of position variation of $\Delta L_i$, $dR_{ik}$ representing the amount of load variation in a k-th support device $S_k$ occurring when the i-th support device $S_i$ shows the amount of position variation of $\Delta L_i$, and k being a natural number of 1 through n:

$$\begin{bmatrix} \Delta R_1 \\ \vdots \\ \Delta R_n \end{bmatrix} = A \times \begin{bmatrix} \Delta L_1 \\ \vdots \\ \Delta L_{j-1} \\ \Delta L_{j+1} \\ \vdots \\ \Delta L_n \end{bmatrix}$$ [Equation 2]

$$A = \begin{bmatrix} \Delta dR_{11} & \cdots & \Delta dR_{1j-1} & \Delta dR_{1j+1} & \cdots & \Delta dR_{1n} \\ \vdots & & \ddots & & & \vdots \\ \Delta dR_{n1} & \cdots & \Delta dR_{nj-1} & \Delta dR_{nj+1} & \cdots & \Delta dR_{nn} \end{bmatrix}.$$ [Equation 3]

Furthermore, a fourth aspect of the present disclosure relates to a method of adjusting, in a machine tool supported by four or more support devices each having a load detector detecting a support load and a support position adjustment mechanism for adjusting a support position, the support positions in the support devices to level a preset reference surface of the machine tool, including:

with the support position in each of the support devices when the reference surface of the machine tool is in a leveled condition designated as a reference support position of each of the support devices, previously obtaining, for each of the support devices, reference position data indicative of the reference support position of the support device when the support devices are positioned in their respective reference support positions and reference load data indicative of a load detected by the load detector of the support device when the support devices are positioned in their respective reference support positions;

based on the obtained reference position data and reference load data, previously obtaining Equation 1 above that is a relational equation between amounts of position variation and amounts of load variation in the support devices with the support position in one support device selected from the support devices fixed, the amounts of position variation being indicative of an amount of variation of the support position in each of the support devices from the reference support position corresponding thereto, the amounts of load variation being indicative of an amount of variation of the load detected by the load detector of each of the support devices; and when load data detected by the load detector of each of the support devices is varied from the reference load data corresponding thereto, first, adjusting the support positions in three support devices selected from the four or more support devices to level the reference surface of the machine tool, subsequently, estimating an adjustment amount for the support position in each of remaining support devices by means of a selected matrix set by selectively extracting columns corresponding to the remaining support devices from the generalized inverse matrix $A^+$ contained in Equation 1 above, and thereafter, adjusting the support position in each of the remaining support devices based on the estimated adjustment amount corresponding thereto.

In this support position adjustment method according to the fourth aspect of the present disclosure, similarly to the above-described aspects, first of all, in a preparatory step, with the support position in each of the support devices when the reference surface of the machine tool is in a leveled condition designated as a reference support position of each of the support devices, for each of the support devices, reference position data indicative of the reference support position of the support device when the support devices are positioned in their respective reference support positions and reference load data indicative of load data detected by the load detector of the support device when the support devices are positioned in their respective reference support positions are previously obtained.

Further, based on the obtained reference position data and reference load data, Equation 1 above is previously obtained that is a relational equation between amounts of position variation and amounts of load variation in the support devices with the support position in one support device selected from the support devices fixed, the amounts of position variation being indicative of an amount of variation of the support position in each of the support devices from the reference support position corresponding thereto, the amounts of load variation being indicative of an amount of variation of a load detected by the load detector of each of the support devices.

Thereafter, when levelness of the reference surface of the machine tool exceeds an allowable range and the load data detected by the load detector or load detectors of one or more of the support devices is thereby varied from the reference load data corresponding thereto, first, the support positions in three support devices selected from the four or more support devices are adjusted, for example, by means of a level, to level the reference surface of the machine tool.

Subsequently, an adjustment amount for the support position in each of remaining support devices is estimated by means of a selected matrix set by selectively extracting columns corresponding to the remaining support devices from the generalized inverse matrix $A^+$ contained in Equation 1 above, and then the support position in each of the remaining support devices is adjusted based on the estimated adjustment amount corresponding thereto.

Thus, with the support position adjustment method according to the fourth aspect of the present disclosure, although the operation of operating the initially selected three support devices to level the reference surface of the machine tool includes "trial-and-error" elements, the adjustment amount for the support position in each of the remaining support devices can be uniquely estimated, Further, using the thus uniquely estimated adjustment amount to adjust the support position in each of the remaining support devices enables the adjustment of each of the remaining support devices to be completed in a single operation without "trial-and-error" operations. Further, with this support position adjustment method, the adjustment amount for the support position in each of the remaining support devices can be accurately estimated.

As described above, with the support position adjustment amount estimation method and support position adjustment amount estimation apparatus according to the first and third aspects of the present disclosure, when levelness of the reference surface of the machine tool exceeds an allowable range, an adjustment amount for the support position in each of the support devices needed for leveling the reference surface can be uniquely estimated.

Further, with the support position adjustment method according to the second aspect of the present disclosure, the reference surface of the machine tool can be leveled in a single adjustment operation without "trial-and-error" operations since the support position in each of the support devices is adjusted based on an adjustment amount uniquely estimated in the above-described manner.

Further, with the support position adjustment method according to the fourth aspect of the present disclosure, although the operation of operating the initially selected three support devices to level the reference surface of the machine tool includes "trial-and-error" elements, an adjustment amount for the support position in each of remaining support devices can be uniquely estimated, and using the thus uniquely estimated adjustment amount to adjust the support position in each of the remaining, support devices enables the adjustment of each of the remaining support devices to be completed in a single operation without "trial-and-error" operations. Further, with this support position adjustment method, the adjustment amount for the support position in each of the remaining support devices can be accurately estimated.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Hereinafter, specific embodiments of the present disclosure will be described with reference to the drawings.

Figure 1:
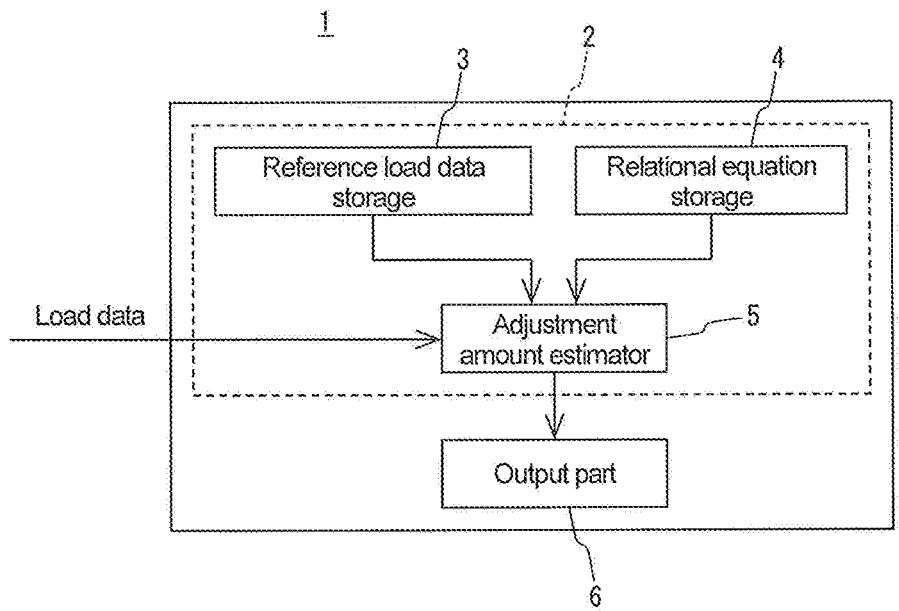
FIG. 1 is a block diagram showing a schematic configuration of a support position adjustment amount estimation apparatus according to an embodiment of the present disclosure.
Figure 2:
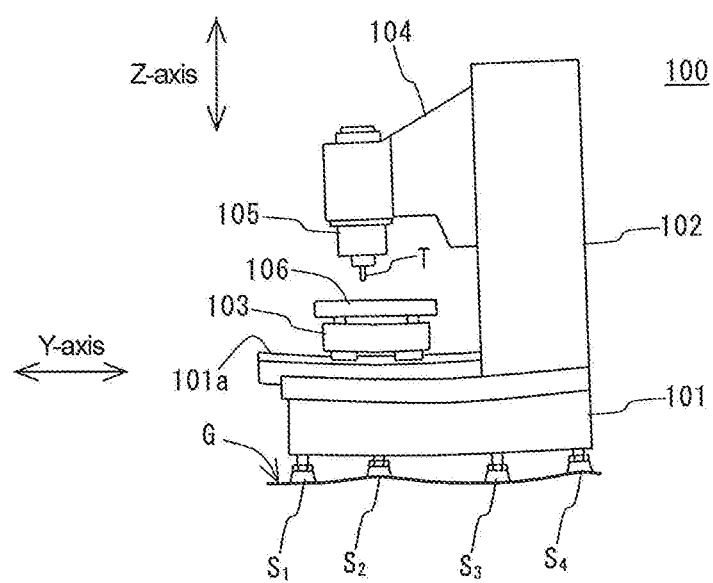
FIG. 2 is an illustration showing a schematic configuration of a machine tool supported in the embodiment, wherein a reference surface of the machine tool is in an unleveled condition.

In a first embodiment shown in FIG. 1, a support position adjustment amount estimation apparatus 1 estimates an adjustment amount for a support position in each of support devices S supporting a machine tool 100, which are shown in FIG. 2. Each element is described below.

1. Machine Tool

The machine tool 100 in this embodiment is a vertical machining center including a bed 101 supported by the support devices S on a ground G, a column 102 disposed, on the bed 101, a saddle 103 disposed on the bed 101 to be movable in a direction of a Y-axis that is indicated by an arrow in FIG. 2, a spindle head 104 disposed on the column 102 to be movable in a direction of a Z-axis that is indicated by an arrow in FIG. 2, a table 106 disposed on the saddle 103 to be movable in a direction of arm X-axis that is orthogonal to both the Y-axis and the Z-axis, and a spindle 105 held by the spindle head 104 to be rotatable about an axis of rotation parallel to the Z-axis. Note that a vertical machining center is given as an example of the machine tool 100 in this embodiment; however, as a matter of course, the machine tool 100 to which the present disclosure can be applied is not limited to such a vertical machining center.

In this machine tool 100, the spindle 105 and the table 106 can be moved relative to each other in the directions of the three orthogonal axes, i.e., in the X-axis Y-axis, and the Z-axis directions, and this relative movement causes a workpiece (not shown) placed on the table 106 to be machined by a tool T attached to the spindle 105. Note that, in this embodiment, the bed 101 is supported by eight support devices S; however, as a matter of course, the number of support devices S supporting the bed 101 is not limited to eight.

2. Support Device

Figure 8:
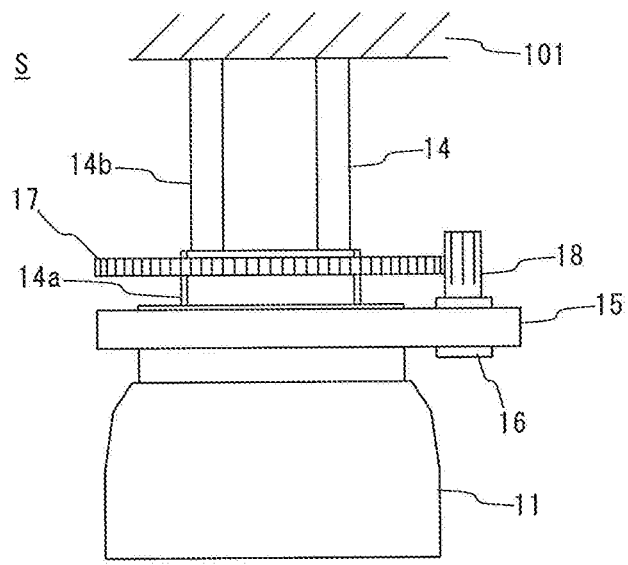
FIG. 8 is a front view of the support device according to the embodiment.
Figure 9:
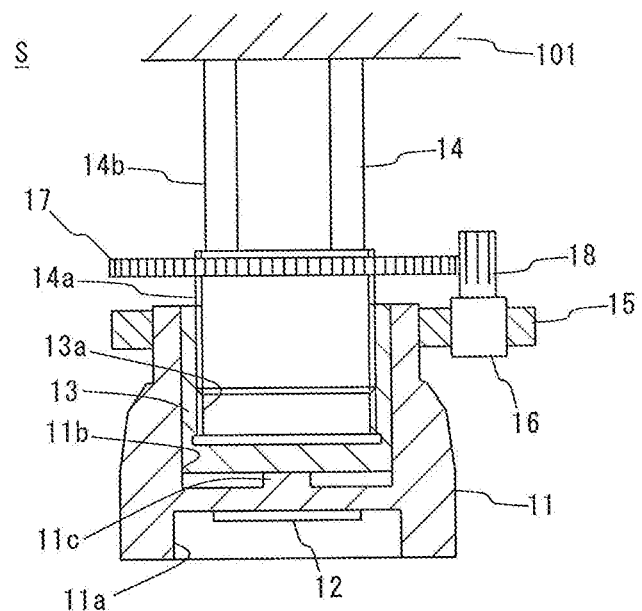
FIG. 9 is a vertical sectional view of the support device shown in FIG. 8.

As shown in FIGS. 8 and 9, the support devices S are each composed of a body 11, a holding member 13 having a bottomed screw hole 13a and supported by the body 11, the screw hole 13a being opened to an upper surface of the holding member 13, a load cell 12 provided on the body 11 to detect a load acting on the body 11, a jack bolt 14 screwed in the screw hole 13a of the holding member 13, a first gear 17 fitted on the jack bolt 14, and a second gear 18 meshing with the first gear 17, a rotary encoder 16 connected to the second gear 18, and a support 15 disposed on the body 11 to hold the rotary encoder 16.

The body 11 has a bottomed lower hole 11a and a bottomed upper hole 11b, the lower hole 11a being opened to a lower surface of the body 11, the upper hole 11b being opened to an upper surface of the body 11. The upper hole 11b has a protrusion 11c provided on the center of the bottom thereof. The load cell 12 is attached to a bottom surface of the lower hole 11a corresponding to the protrusion 11c.

The holding member 13 is inserted in the upper hole 11b of the body 11 and a lower surface of the holding member 13 is in contact with the protrusion 11c. The jack bolt 14 has a hexagonal part 14b on an upper part thereof and a screw shaft 14a on a lower part thereof, the hexagonal part 14b being formed to have a regular hexagonal cross section. The screw shaft 14a is screwed in the screw hole 13a of the holding member 13, and the hexagonal part 14b supports the bed 101 of the machine tool 100 on the top thereof. The jack bolt 14 is moved vertically by rotating the jack bolt 14, and this vertical movement changes a support position for supporting the bed 101. The first gear 17 is fitted on and fixed to the screw shaft 14a of the jack bolt 14, and the support 15 is fitted on and fixed to an upper portion of the body 11.

As above, in this support device S, the jack bolt 14 is moved vertically by operating the hexagonal part 14b to rotate the jack bolt 14, and this vertical movement changes the support position in supporting the bed 101. In this way, the support position in the support device S is adjusted.

When the jack bolt 14 is rotated, the first gear 17 rotates together with the jack bolt 14 and the second gear 18 meshing with the first gear 17 also rotates, and an amount of rotation of the second gear 18 is detected by the rotary encoder 16. Based on a gear ratio between the first gear 17 and the second gear 18 as well as the amount of rotation of the second gear 18, an amount of rotation of the first gear 17, that is, an amount of rotation of the jack bolt 14, can be calculated. Based on the amount of rotation of the jack bolt 14 as well as a lead of the screw shaft 14a of the jack bolt 14, an amount of vertical movement of the jack bolt 14 can be calculated. Note that, in this example, the gear ratio between the first gear 17 and the second gear 18 is 10.

As described above, in this support device S, the support position for supporting the bed 101 can be adjusted by operating the hexagonal part 14b to rotate the jack bolt 14, and the position of the support by the jack bolt 14, that is, a vertical position of the jack bolt 14, is detected by the rotary encoder 16. Further, a support load acting on the jack bolt 14 is detected by the load cell 12.

As seen from the foregoing, with the support device S according to this embodiment, support position adjustment, support position detection, and support load detection can be carried out by a single device. A support device S having such a function has never existed.

3. Support Position Adjustment Amount Estimation Apparatus

The support position adjustment amount estimation apparatus 1 estimates an adjustment amount for a current support position in each of the support devices S needed for leveling a reference surface 101a set on the bed 101 of the machine tool 100. The details of the support position adjustment amount estimation apparatus 1 are described below.

As shown in FIG. 1, the support position adjustment amount estimation apparatus 1 consists of a computing part 2 and an output part 6, and the computing part 2 consists of a reference load data storage 3, a relational equation, storage 4, and an adjustment amount estimator 5. Note that the computing part 2 is composed of a computer including a CPU, a RAM, and a ROM, and the adjustment amount estimator 5 is functionally implemented by a computer program so as to execute the processing described below. Further, the reference load data storage 3 and the relational equation storage 4 are composed of an appropriate storage medium such as a RAM.

Figure 3:
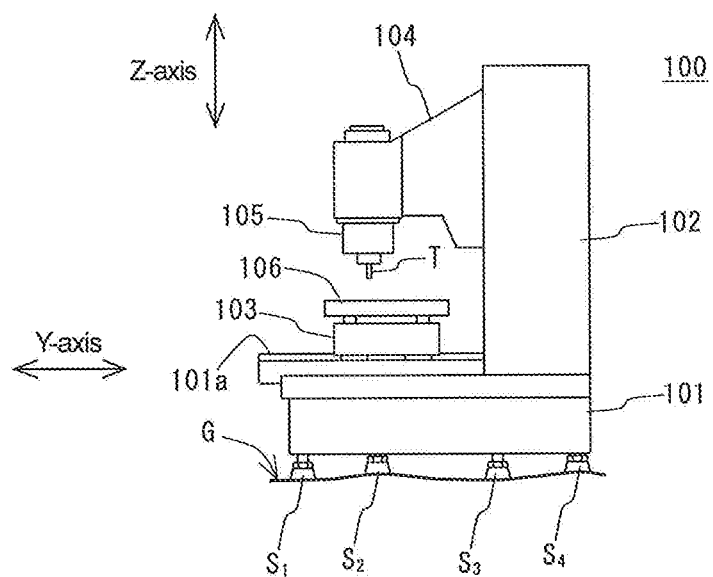
FIG. 3 is an illustration showing the schematic configuration of the machine tool supported in the embodiment, wherein the reference surface of the machine tool is in a leveled condition.

The reference load data storage 3 has previously stored therein reference position data and reference load data for each support device $S_i$. The reference position data is height-direction position data which is, with the support position in each support device $S_i$ when the reference surface 101a of the machine tool 100 is in a leveled condition designated as a reference support position of each support device $S_i$, calculated based on angle data output from the rotary encoder 16 when the support devices S are positioned in their respective reference support positions. The reference load data is load data which is detected by the load cell 12 when the support devices S are positioned in their respective reference support positions. Note that the machine tool 100 has been adjusted so that the reference surface 101a of the machine tool 100 is leveled, by adjusting the support position in each support device $S_i$ by means of an instrument capable of measuring levelness, such as a level. in this connection, FIG. 2 shows a state where the reference surface 101a of the machine tool 100 is in an unleveled condition, while FIG. 3 shows a state where the reference surface 101a of the machine tool 100 has been leveled by adjusting each support device $S_i$.

The relational equation storage 4 stores therein a relational equation between amounts of position variation and amounts of load variation in the support devices S, the amounts of position variation being indicative of an amount of variation of the support position in each support device $S_i$ from the reference support position corresponding thereto, the amounts of load variation being indicative of an amount of variation of load data detected by the load cell 12 of each support device $S_i$ from the reference load data corresponding thereto.

Figure 4:
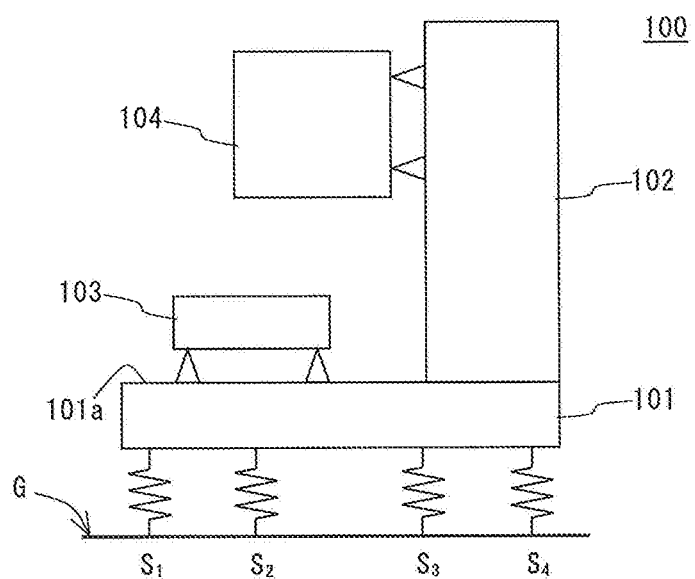
FIG. 4 is an illustration showing a model of the machine tool in the embodiment.
Figure 5:
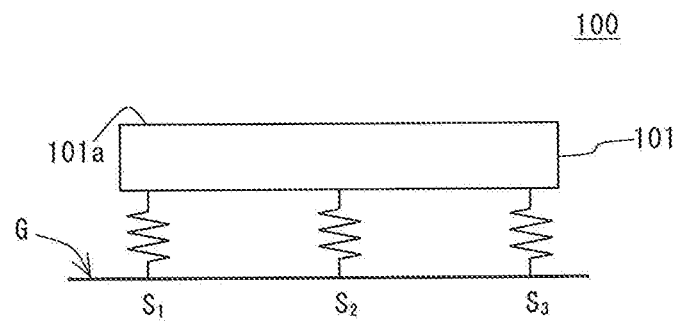
FIG. 5 is an illustration showing a simplified model of the model shown in FIG. 4.

This relational equation is obtained as follows. First, the machine tool 100 shown in FIG. 3 is modeled as shown in FIG. 4, and then a simplified model thereof as shown in FIG. 5 is created.

Figure 6:
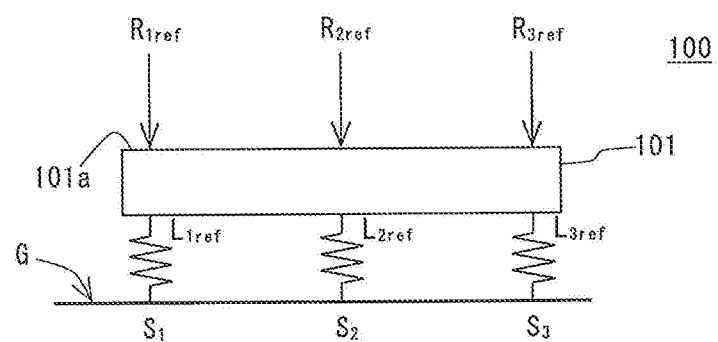
FIG. 6 is an illustration showing a supported state of the simplified model shown in FIG. 5, wherein support devices are positioned in their respective reference support positions.
Figure 7:
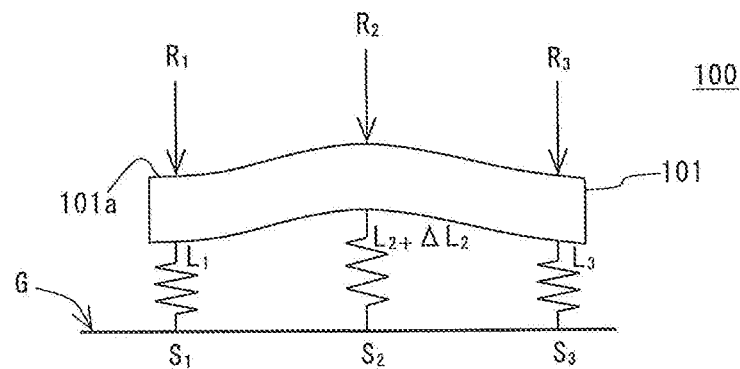
FIG. 7 is an illustration showing a supported state of the simplified model shown in FIG. 5, wherein a support position in one support device is varied.

As shown in FIG. 6, the reference loads in the support devices $S_1$ to $S_3$ (output values of the load cells 12 of the support devices $S_1$ to $S_3$) when the reference surface 101$a$ of the simplified model is in a leveled condition are denoted by $R_{1ref}$, $R_{2ref}$, and $R_{3ref}$, respectively. Further, the reference support positions of the support devices $S_1$ to $S_3$ (height-direction position data calculated based on the angle data output from the rotary encoders 16 of the support devices $S_1$ to $S_3$) when the reference surface 101$a$ of the simplified model is in the leveled condition are denoted by $L_{1ref}$, $L_{2ref}$, and $L_{3ref}$, respectively. When the support position in one support device $S_i$ (i=1 to 3) is varied by $\Delta L_i$ as shown in FIG. 7, an amount of variation $\Delta R_i$ of the load in each support device $S_k$ (k=1 to 3), including the support device $S_i$, is represented by Equation 4 below:

$$\Delta R_i = dR_{ik} \times \Delta L_i,$$ [Equation 4]

where $dR_{ik}$ is an amount of variation of the load in each support device $S_k$ (k=1 to 3) occurring when the support position in one support device $S_i$ (i=1 to 3) is changed by a unit length.

If the principle of superposition holds for the amount of variation of the load in each support device $S_i$ caused by variation of the support position in each support device $S_i$, the amount of variation $dR_i$ of the load in each support device $S_i$ is represented by Equation 5 below:

$$\Delta R_i = \Sigma dR_{ik} \times \Delta L_i,$$ [Equation 5]

When the number of support devices $S_i$ is expanded from 3 to n, the amount of variation $dR_i$ of the load in each support device $S_i$ (i is a natural number of 1 through n) is represented by Equation 6 below:

$$\begin{bmatrix} \Delta R_1 \\ \vdots \\ \Delta R_n \end{bmatrix} = \begin{bmatrix} \Delta dR_{11} & \cdots & \Delta dR_{1n} \\ \vdots & \ddots & \vdots \\ \Delta dR_{n1} & \cdots & \Delta dR_{nn} \end{bmatrix} \begin{bmatrix} \Delta L_1 \\ \vdots \\ \Delta L_n \end{bmatrix}.$$ [Equation 6]

Note that the aforementioned k is also a natural number of 1 through n.

Figure 10:
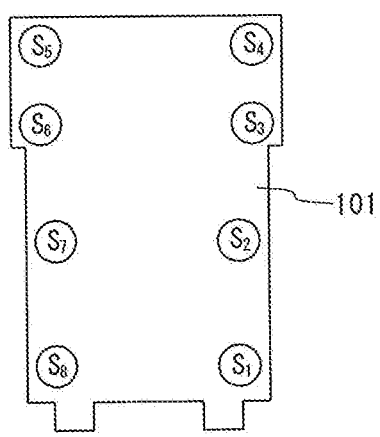
FIG. 10 is an illustration showing an example arrangement of the support devices in the embodiment.
Figure 11:
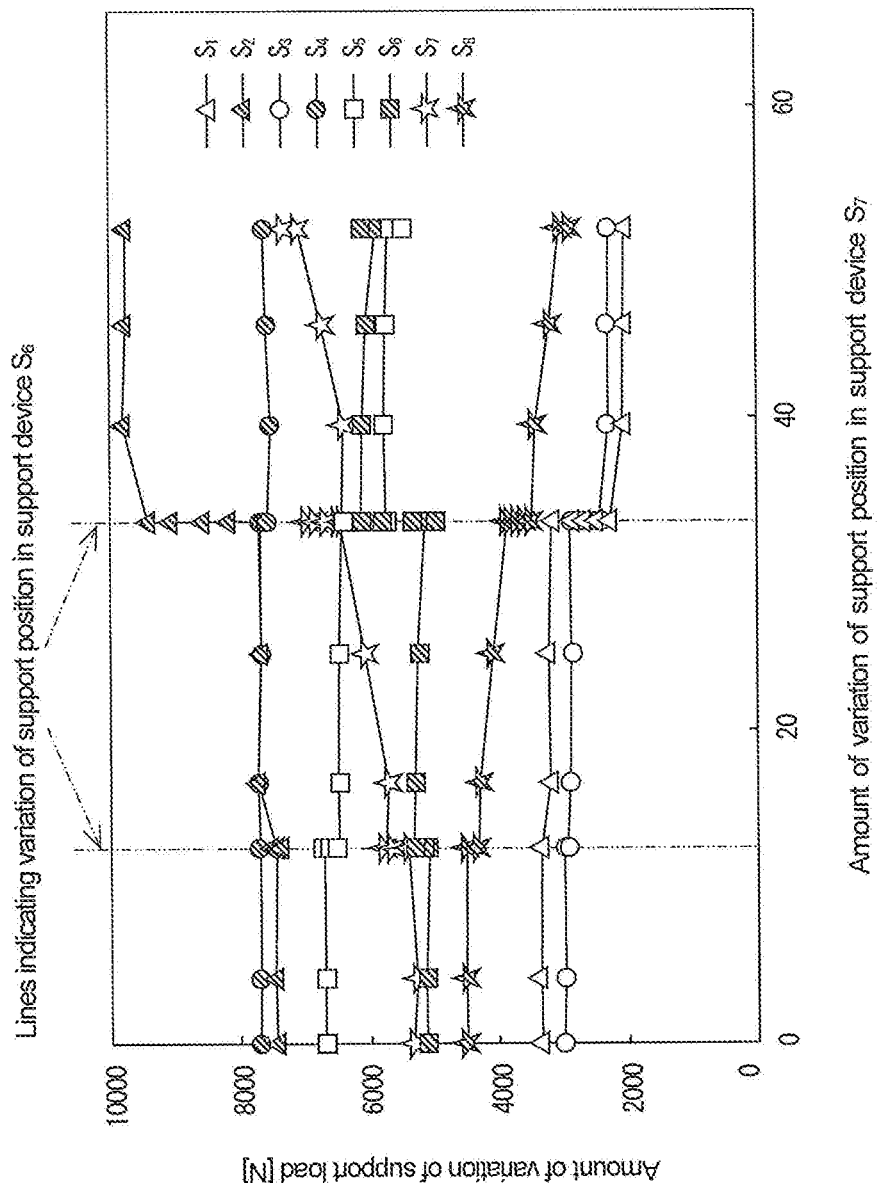
FIG. 11 is an illustration for explaining applicability of the principle of superposition to support load.

In this connection, with the bed 101 of the machine tool 100 supported by eight support devices $S_1$ to $S_8$ as shown in FIG. 10 such that the reference surface 101$a$ was leveled, the support positions in the support devices $S_6$ and $S_7$ were moved upward from their respective reference support positions in increments of about 5 μm until the amount of movement amounts to about 50 μm. The support loads in the support positions $S_1$ to $S_8$ detected in this process are shown in FIG. 11. Note that the movement of the support positions in the support devices $S_6$ and $S_7$ was performed in the following sequence: only the support position in the support device $S_7$ was moved upward by about 5 μm at a time, three times; only the support position in the support device $S_6$ was moved upward by about 5 μm at a time, five times; only the support position in the support device $S_7$ was moved upward by about 5 μm at a time, three times; only the support position in the support device $S_6$ was moved upward by about 5 μm at a time, five times, and only the support position in the support device $S_7$ was moved upward by about 5 μm at a time, four times.

As shown in FIG. 11, when the support positions in the support devices $S_6$ and $S_7$ were varied individually, not only the support loads in the support devices $S_6$ and $S_7$, the support positions in which are moved, but also the support loads in the support devices $S_1$ to $S_5$ and $S_8$ were varied. From this finding, it is understood that the principle of superposition holds for the amount of variation of the load in each support device $S_i$ caused by variation of the support position in each support device $S_i$.

Based on Equation 6 above, the amount of variation $\Delta L_i$ of the support position in each support device $S_i$ can be calculated by Equation 7 below:

$$\begin{bmatrix} \Delta L_1 \\ \vdots \\ \Delta L_n \end{bmatrix} = \begin{bmatrix} \Delta dR_{11} & \cdots & \Delta dR_{1n} \\ \vdots & \ddots & \vdots \\ \Delta dR_{n1} & \cdots & \Delta dR_{nn} \end{bmatrix}^{-1} \begin{bmatrix} \Delta R_1 \\ \vdots \\ \Delta R_n \end{bmatrix}.$$ [Equation 7]

Note that, in the case of using Equation 7 above, the support positions in all of the support devices $S_i$ are adjusted. However, if adjusting the support positions in all of the support devices $S_i$ is allowed, the solution to the support position in each support device $S_i$ contains a certain support position which allows the reference surface 101$a$ to be leveled through another support position which is reached when the support devices $S_i$ are translated. Therefore, Equation 7 above is not able to provide a unique solution, Hence, Equation 1 below with one support device $S_j$ (j is any value from 1 to n) of the support devices $S_i$ fixed is used to calculate an adjustment amount $\Delta Lt_i$ for the support position in each support device $S_i$:

$$\begin{bmatrix} \Delta Lt_1 \\ \vdots \\ \Delta Lt_{j-1} \\ \Delta Lt_{j+1} \\ \vdots \\ \Delta Lt_n \end{bmatrix} = A^+ \times \begin{bmatrix} \Delta R_1 \\ \vdots \\ \Delta R_n \end{bmatrix},$$ [Equation 1]

where $A^+$ is a generalized inverse matrix of a matrix A below holding with $\Delta R_i$ representing the amount of load variation in, an i-th support device $S_i$ occurring when the i-th support device $S_i$ shows the amount of position variation of $\Delta L_i$, and $dR_{ik}$ representing the amount of load variation in a k-th support device $S_k$ occurring when the i-th support device $S_i$ shows the amount of position variation of $\Delta L_i$:

$$\begin{bmatrix} \Delta R_1 \\ \vdots \\ \Delta R_n \end{bmatrix} = A \times \begin{bmatrix} \Delta L_1 \\ \vdots \\ \Delta L_{j-1} \\ \Delta L_{j+1} \\ \vdots \\ \Delta L_n \end{bmatrix}$$ [Equation 2]

-continued $$A = \begin{bmatrix} \Delta dR_{11} & \cdots & \Delta dR_{1j-1} & \Delta dR_{1j+1} & \cdots & \Delta dR_{1n} \\ \vdots & \ddots & & & & \vdots \\ \Delta dR_{n1} & \cdots & \Delta dR_{nj-1} & \Delta dR_{nj+1} & \cdots & \Delta dR_{nn} \end{bmatrix}. \quad \text{[Equation 3]}$$

The adjustment amount estimator 5 inputs therein the load data detected by the load cell 12 of each support device $S_i$, calculates an amount of variation $\Delta R_i$ of the support load in each support device $S_i$ based on the input load data and the reference load data for each support device $S_i$ stored in the reference load data storage 3, and estimates an adjustment amount $\Delta Lt_i$ for the support position in each support device $S_i$ based on the calculated amount of variation $\Delta R_i$ of the support load in each support device $S_i$ and the relational equation (Equation 1 above) stored in the relational equation storage 4.

The output part 6 includes a display which is composed of a liquid crystal panel or the like, and displays the adjustment amount $\Delta Lt_i$ for the support position in each support device $S_i$ estimated by the adjustment amount estimator 5.

In the support position adjustment amount estimation apparatus 1 according to this embodiment having the above-described configuration, when levelness of the reference surface 101a of the machine tool 100 exceeds an allowable range due to secular change or the like and the load data detected by the load cell 12 or load cells 12 of one or more of the support devices S is thereby varied from the reference load data corresponding thereto stored in the reference load data storage 3, the adjustment amount estimator 5 estimates an adjustment amount $\Delta Lt_i$ for the current support position in each support device $S_i$ needed for leveling the reference surface 101a of the machine tool 100, and the estimated adjustment amount $\Delta Lt_i$ is displayed in the output part 6.

Specifically, the load data detected by the load cell 12 of each support device $S_i$ is input into the adjustment amount estimator 5, and the adjustment amount estimator 5 calculates an amount of variation $\Delta R_i$ of the support load in each support device $S_i$ based on the input load data related to each, support device $S_i$ and the reference load data for each support device $S_i$ stored in the reference load data storage 3 and estimates an adjustment amount $\Delta Lt_i$ for the support position in each support device $S_i$ based on the calculated amount of variation $\Delta R_i$ of the support load in each support device Si and the relational equation (Equation 1 above) stored in the relational equation storage 4.

Based on the adjustment amount $\Delta Lt_i$ for the support position in each support device $S_i$ that is estimated by the adjustment amount estimator 5 and displayed in the output part 6 in the above-described manner, an operator adjusts the support position in each support device $S_i$ by the adjustment amount $\Delta Lt_i$ corresponding thereto by operating the jack bolt 14 of the support device $S_i$ while checking the support position in the support device $S_i$ recognized from the output value of the rotary encoder 16 of the support device $S_i$. Thereby, the reference surface 101a of the machine tool 100 can be restored to the leveled condition. Note that this support device S according to this embodiment enables adjustment of the support position in the support device S, detection of the support position in the support device S, and detection of the support load in the support device S to be carried out by a single device; therefore, the adjustment of the support position in the support device S can be carried out very efficiently.

Thus, with the support position adjustment amount estimation apparatus according to this embodiment, when levelness of the reference surface 101a of the machine tool 100 exceeds an allowable range, an adjustment amount $\Delta Lt_i$ for the support position in each support device $S_i$ needed for leveling the reference surface 101a can be uniquely estimated. Using the thus uniquely estimated adjustment amount $\Delta Lt_i$ to adjust the support position in each support device $S_i$ enables the reference surface 101a of the machine tool 100 to be restored to the leveled condition in a single adjustment operation without "trial-and-error" operations.

In a second embodiment, a support position adjustment method adjusts the support positions in the support devices $S_i$ when restoring the reference surface 101a of the machine tool 100 to the leveled condition. This support position adjustment method according to the second embodiment is effective for a case where the adjustment amount $\Delta Lt_i$ obtained by the above-described support position adjustment amount estimation apparatus 1 according to the first embodiment and the support position adjustment amount estimation method using the same contains a large error. The details of the support position adjustment method according to the second embodiment are described below. Note that this method requires the machine tool 100 to be supported by four or more support devices S, and the machine tool 100 in this example is supported by eight support devices $S_1$ to $S_8$ as shown in FIG. 10.

In the support position adjustment method according to the second embodiment, when levelness of the reference surface 101a of the machine tool 100 exceeds an allowable range due to secular change or the like and the load data detected by the load cell 12 or load cells 12 of one or more of the support devices S is thereby varied from the reference load data corresponding thereto stored in the reference load data storage 3, first, the support positions in three support devices S selected from the support devices $S_1$ to $S_8$ are adjusted by means of a measurement instrument, such as a level, to level the reference surface 101a of the machine tool 100.

Subsequently, an adjustment amount $\Delta Lt$ for the support position in each of the remaining support devices S is estimated by means of a selected matrix which is set by selectively extracting columns corresponding to the remaining support devices S from the generalized inverse matrix $A^+$ contained in the relational equation (Equation 1 above).

For example, in a case where the reference surface 101a of the machine tool 100 is leveled with three support devices $S_3$, $S_5$, and $S_8$, adjustment amounts $\Delta Lt_1$, $\Delta Lt_2$, $\Delta Lt_4$, $\Delta Lt_6$, and $\Delta Lt_7$ for the support positions in the remaining five support devices $S_1$, $S_2$, $S_4$, $S_6$, and $S_7$ are calculate by means of Equation 8 below that is a selected matrix for the remaining five support devices $S_1$, $S_2$, $S_4$, $S_6$, and $S_7$:

$$\begin{bmatrix} \Delta Lt_1 \\ \Delta Lt_2 \\ \Delta Lt_4 \\ \Delta Lt_6 \\ \Delta Lt_7 \end{bmatrix} = \begin{bmatrix} \Delta dR_{11} & \Delta dR_{12} & \Delta dR_{14} & \Delta dR_{16} & \Delta dR_{17} \\ \vdots & \vdots & \vdots & \vdots & \vdots \\ \Delta dR_{81} & \Delta dR_{82} & \Delta dR_{84} & \Delta dR_{86} & \Delta dR_{87} \end{bmatrix}^+ \times \begin{bmatrix} \Delta R_1 \\ \vdots \\ \Delta R_8 \end{bmatrix}. \quad \text{[Equation 8]}$$

Based on the calculated adjustment amounts $\Delta Lt_1$, $\Delta Lt_2$, $\Delta Lt_4$, $\Delta Lt_6$, and $\Delta Lt_7$ for the support positions in the remaining support devices $S_1$, $S_2$, $S_4$, $S_6$, and $S_7$, the operator adjusts the support position in each of the remaining support devices S₁, S₂, S₄, S₆, and S₇ by the adjustment amount ΔLt₁, ΔLt₂, ΔLt₄, ΔLt₆, ΔLt₇ corresponding thereto by operating the jack bolt 14 of the support device while checking the support position in the support device recognized from the output value of the rotary encoder 16 of the support device.

Through these operations, the reference surface 101*a* of the machine tool 100 can be restored to the leveled condition with the machine tool 100 supported equally by all of the support devices S$_i$.

As described above, with the support position adjustment method according to the second embodiment, although the operation of operating the initially selected three support devices S to level the reference surface 101*a* of the machine tool 100 includes "trial-and-error" elements, an adjustment amount ΔLt for the support positions in each of the remaining support devices S can be uniquely estimated. Using the thus uniquely estimated adjustment amount ΔLt to adjust the support position in each of the remaining support devices S enables the adjustment of each of the remaining support devices S to be completed in a single operation without "trial-and-error" operations.

Further, with this support position adjustment method, the adjustment amount ΔLt for the support position in each of the remaining support devices S can be accurately estimated.

Note that, when selecting three support devices S from the support devices S$_i$, it is possible to select a combination of three support devices S which most stably supports the machine tool 100, based on empirical knowledge; however, it is preferred to select a combination of three support devices S which has the smallest value for a condition number κ(A) represented by Equation 9 below;

$$c(A) = \|A\|_2 \times \|A^{-1}\|_2 \qquad \text{[Equation 9]}$$

In this way, it is possible to minimize errors objectively and theoretically without relying on a subjective element such as an instinct.

Hereinbefore, specific embodiments of the present disclosure have been described. However, the above description of the embodiments is illustrative in all aspects and is not limiting. One skilled in the art would be able to make variations and modifications as appropriate. The scope of the present disclosure is not defined by the above-described embodiments, but is defined by the appended claims. Further, the scope of the present disclosure encompasses changes made from the embodiments within the scope equivalent to the scope of the claims.

What is claimed is:

1. A method of, in a machine tool supported by three or more support devices each having a load detector detecting a support load and a support position adjustment mechanism for adjusting a support position, estimating an adjustment amount for a current support position in each of the support devices needed for leveling a preset reference surface of the machine tool, and adjusting the support position in each of the support devices based on the estimated adjustment amount, comprising:

with the support position in each of the support devices when the preset reference surface of the machine tool is in a leveled condition designated as a reference support position of each of the support devices, obtaining reference position data indicative of the reference support position of each of the support devices when the support devices are positioned in their respective reference support positions and reference load data indicative of a load detected by the load detector of each of the support devices when the support devices are positioned in their respective reference support positions;

based on the obtained reference position data and reference load data, obtaining a relational equation between amounts of position variation and amounts of load variation in the support devices obtained when the support position in one support device selected from the support devices is fixed, the amounts of position variation being indicative of an amount of variation of the support position in each of the support devices from the reference support position corresponding thereto, the amounts of load variation being indicative of an amount of variation of load data indicative of the load detected by the load detector of each of the support devices from the reference load data corresponding thereto;

when the load data indicative of the load detected by the load detector of each of the support devices is varied from the reference load data corresponding thereto, estimating the adjustment amount for the support position in each of the support devices other than the fixed support device based on the amounts of load variation detected by all of the support devices and the relational equation; and based on the estimated adjustment amount, adjusting the support position in a corresponding support device.

2. The method according to claim 1, wherein the relational equation is represented by an equation below with ΔLt$_i$ representing the adjustment amount for the support position in an i-th support device S$_i$, ΔR$_i$ representing the amount of load variation in the i-th support device S$_i$, i being a natural number of 1 through n, and j being any value from 1 to n for referring to the fixed support device S$_j$:

$$\begin{bmatrix} \Delta Lt_1 \\ \vdots \\ \Delta Lt_{j-1} \\ \Delta Lt_{j+1} \\ \vdots \\ \Delta Lt_n \end{bmatrix} = A^+ \times \begin{bmatrix} \Delta R_1 \\ \vdots \\ \Delta R_n \end{bmatrix}, \qquad \text{[Equation 1]}$$

where A⁺ is a generalized inverse matrix of a matrix A below holding with ΔR$_i$ representing the amount of load variation in the i-th support device S$_i$ occurring when the i-th support device S$_i$ shows the amount of position variation of ΔL$_i$, dR$_{ik}$ representing the amount of load variation in a k-th support device S$_k$ occurring when the i-th support device S$_i$ shows the amount of position variation of ΔL$_i$, and k being a natural number of 1 through n:

$$\begin{bmatrix} \Delta R_1 \\ \vdots \\ \Delta R_n \end{bmatrix} = A \times \begin{bmatrix} \Delta L_1 \\ \vdots \\ \Delta L_{j-1} \\ \Delta L_{j+1} \\ \vdots \\ \Delta L_n \end{bmatrix} \qquad \text{[Equation 2]}$$

$$A = \begin{bmatrix} \Delta dR_{11} & \cdots & \Delta dR_{1j-1} & \Delta dR_{1j+1} & \cdots & \Delta dR_{1n} \\ \vdots & & \ddots & & & \vdots \\ \Delta dR_{n1} & \cdots & \Delta dR_{nj-1} & \Delta dR_{nj+1} & \cdots & \Delta dR_{nn} \end{bmatrix}. \qquad \text{[Equation 3]}$$

3. A method of adjusting, in a machine tool supported by four or more support devices each having a load detector detecting a support load and a support position adjustment mechanism for adjusting a support position, the support positions in the support devices to level a preset reference surface of the machine tool, comprising:

with the support position in each of the support devices when the preset reference surface of the machine tool is in a leveled condition designated as a reference support position of each of the support devices, previously obtaining reference position data indicative of the reference support position of each of the support devices when the support devices are positioned in their respective reference support positions and reference load data indicative of a load detected by the load detector of each of the support devices when the support devices are positioned in their respective reference support positions;

based on the obtained reference position data and reference load data, previously obtaining a relational equation between amounts of position variation and amounts of load variation in the support devices obtained when the support position in one support device selected from the support devices is fixed, the amounts of position variation being indicative of an amount of variation of the support position in each of the support devices from the reference support position corresponding thereto, the amounts of load variation being indicative of an amount of variation of the load detected by the load detector of each of the support devices; and when load data indicative of the load detected by the load detector of each of the support devices is varied from the reference load data corresponding thereto, first, adjusting the support positions in three support devices selected from the four or more support devices to level the preset reference surface of the machine tool, subsequently, estimating an adjustment amount for the support position in each of remaining support devices by means of a selected matrix set by selectively extracting columns corresponding to the remaining support devices from a generalized inverse matrix $A^+$ contained in the relational equation, and thereafter, adjusting the support position in each of the remaining support devices based on the estimated adjustment amount corresponding thereto, the relational equation being represented by an equation below with $\Delta Lt_i$ representing the adjustment amount for the support position in an i-th support device $S_i$, $\Delta R_i$ representing the amount of load variation in the i-th support device $S_i$, i being a natural number of 1 through n, and j being any value from 1 to n for referring to the fixed support device $S_j$:

$$\begin{bmatrix} \Delta Lt_1 \\ \vdots \\ \Delta Lt_{j-1} \\ \Delta Lt_{j+1} \\ \vdots \\ \Delta Lt_n \end{bmatrix} = A^+ \times \begin{bmatrix} \Delta R_1 \\ \vdots \\ \Delta R_n \end{bmatrix}, \quad \text{[Equation 1]}$$

where $A^+$ is a generalized inverse matrix of a matrix A below holding with $\Delta R_i$ representing the amount of load variation in the i-th support device $S_i$ occurring when the i-th support device $S_i$ shows the amount of position variation of $\Delta L_i$, $dR_{ik}$ representing the amount of load variation in a k-th support device $S_k$ occurring when the i-th support device $S_i$ shows the amount of position variation of $\Delta L_i$, and k being a natural number of 1 through n:

$$\begin{bmatrix} \Delta R_1 \\ \vdots \\ \Delta R_n \end{bmatrix} = A \times \begin{bmatrix} \Delta L_1 \\ \vdots \\ \Delta L_{j-1} \\ \Delta L_{j+1} \\ \vdots \\ \Delta L_n \end{bmatrix} \quad \text{[Equation 2]}$$

$$A = \begin{bmatrix} \Delta dR_{11} & \cdots & \Delta dR_{1j-1} & \Delta dR_{1j+1} & \cdots & \Delta dR_{1n} \\ \vdots & & \ddots & & & \vdots \\ \Delta dR_{n1} & \cdots & \Delta dR_{nj-1} & \Delta dR_{nj+1} & \cdots & \Delta dR_{nn} \end{bmatrix}. \quad \text{[Equation 3]}$$

4. An apparatus for estimating, in a machine tool supported by three or more support devices each having a load detector detecting a support load and a support position adjustment mechanism for adjusting a support position, an adjustment amount for a current support position in each of the support devices needed for leveling a preset reference surface of the machine tool, comprising:

a reference load data storage storing, with the support position in each of the support devices when the preset reference surface of the machine tool is in a leveled condition designated as a reference support position of each of the support devices, reference load data indicative of a load detected by the load detector of each of the support devices when the support devices are positioned in their respective reference support positions;

a relational equation storage storing a relational equation between amounts of position variation and amounts of load variation in the support devices obtained when the support position in one support device selected from the support devices is fixed, the amounts of position variation being indicative of an amount of variation of the support position in each of the support devices from the reference support position corresponding thereto, the amounts of load variation being indicative of an amount of variation of load data indicative of the load detected by the load detector of each of the support devices from the reference load data corresponding thereto;

an adjustment amount estimator uniquely estimating the adjustment amount for the support position in each of the support devices other than the fixed support device based on the load data indicative of the loads detected by the load detectors of all of the support devices, the reference load data for all of the support devices stored in the reference load data storage, and the relational equation stored in the relational equation storage; and based on the estimated adjustment amount, adjusting the support position using a corresponding support position adjustment mechanism in a corresponding support device.

5. The apparatus according to claim 4, wherein the relational equation stored in the relational equation storage is represented by an equation below with $\Delta Lt_i$ representing the adjustment amount for the support position in an i-th support device $S_i$, $\Delta R_i$ representing the amount of load variation in the i-th support device $S_i$, i being a natural number of 1 through n, and j being any value from 1 to n for referring to the fixed support device $S_j$:

$$\begin{bmatrix} \Delta Lt_1 \\ \vdots \\ \Delta Lt_{j-1} \\ \Delta Lt_{j+1} \\ \vdots \\ \Delta Lt_n \end{bmatrix} = A^+ \times \begin{bmatrix} \Delta R_1 \\ \vdots \\ \Delta R_n \end{bmatrix}, \quad \text{[Equation 1]}$$

where $A^+$ is a generalized inverse matrix of a matrix A below holding with $\Delta R_i$ representing the amount of load variation in the i-th support device $S_i$ occurring when the i-th support device $S_i$ shows the amount of position variation of $\Delta L_i$, $dR_{ik}$ representing the amount of load variation in a k-th support device $S_k$ occurring when the i-th support device $S_i$ shows the amount of position variation of $\Delta L_i$, and k being a natural number of 1 through n:

$$\begin{bmatrix} \Delta R_1 \\ \vdots \\ \Delta R_n \end{bmatrix} = A \times \begin{bmatrix} \Delta L_1 \\ \vdots \\ \Delta L_{j-1} \\ \Delta L_{j+1} \\ \vdots \\ \Delta L_n \end{bmatrix} \quad \text{[Equation 2]}$$

$$A = \begin{bmatrix} \Delta dR_{11} & \cdots & \Delta dR_{1j-1} & \Delta dR_{1j+1} & \cdots & \Delta dR_{1n} \\ \vdots & & \ddots & & & \vdots \\ \Delta dR_{n1} & \cdots & \Delta dR_{nj-1} & \Delta dR_{nj+1} & \cdots & \Delta dR_{nn} \end{bmatrix}. \quad \text{[Equation 3]}$$

\* \* \* \* \*